US008861927B2

(12) United States Patent
Sirivara et al.

(10) Patent No.: US 8,861,927 B2
(45) Date of Patent: Oct. 14, 2014

(54) DIGITAL MEDIA UNIVERSAL ELEMENTARY STREAM

(75) Inventors: Sudheer Sirivara, Redmond, WA (US); James D. Johnston, Redmond, WA (US); Naveen Thumpudi, Redmond, WA (US); Wei-Ge Chen, Sammamish, WA (US); Serge Smirnov, Redmond, WA (US); Chris Messer, Redmond, VT (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 13/360,577

(22) Filed: Jan. 27, 2012

(65) Prior Publication Data

US 2012/0130721 A1 May 24, 2012

Related U.S. Application Data

(62) Division of application No. 10/966,443, filed on Oct. 15, 2004.

(60) Provisional application No. 60/562,671, filed on Apr. 14, 2004, provisional application No. 60/580,995, filed on Jun. 18, 2004.

(51) Int. Cl.
*H04N 9/80* (2006.01)
*G10L 19/16* (2013.01)

(52) U.S. Cl.
CPC .................................... *G10L 19/167* (2013.01)
USPC .......................................................... 386/239

(58) Field of Classification Search
CPC ..................................................... G10L 19/167
USPC .......................................................... 386/239
See application file for complete search history.

(56) References Cited

U.S. PATENT DOCUMENTS 5,617,263 A 4/1997 Mizushima et al.
6,536,011 B1 3/2003 Jang et al.

(Continued)

FOREIGN PATENT DOCUMENTS

JP 2000-306325 11/2000
JP 2001-086453 3/2001

(Continued)

OTHER PUBLICATIONS

Notice of Preliminary Rejection (English translation), KR Application No. 10-2005-30768, 1 page, Jan. 20, 2012.

(Continued)

*Primary Examiner* — William C Vaughn, Jr.
*Assistant Examiner* — Naod Belai
(74) *Attorney, Agent, or Firm* — Micah Goldsmith; Judy Yee; Micky Minhas

(57) ABSTRACT

Described techniques and tools include techniques and tools for mapping digital media data (e.g., audio, video, still images, and/or text, among others) in a given format to a transport or file container format useful for encoding the data on optical disks such as digital video disks (DVDs). A digital media universal elementary stream can be used to map digital media streams (e.g., an audio stream, video stream or an image) into any arbitrary transport or file container, including optical disk formats, and other transports, such as broadcast streams, wireless transmissions, etc. The information to decode any given frame of the digital media in the stream can be carried in each coded frame. A digital media universal elementary stream includes stream components called chunks. An implementation of a digital media universal elementary stream arranges data for a media stream in frames, the frames having one or more chunks.

20 Claims, 7 Drawing Sheets

(56) References Cited

U.S. PATENT DOCUMENTS

| | | | | |
|---|---|---|---|---|
| 2001/0026561 | A1* | 10/2001 | Morris et al. | 370/487 |
| 2003/0215215 | A1 | 11/2003 | Imahashi et al. | |
| 2004/0017997 | A1 | 1/2004 | Cowgill et al. | |
| 2004/0165734 | A1 | 8/2004 | Li | |
| 2004/0222963 | A1* | 11/2004 | Guo et al. | 345/156 |
| 2009/0327510 | A1 | 12/2009 | Edelman et al. | |

FOREIGN PATENT DOCUMENTS

| | | |
|---|---|---|
| JP | 2002-184114 | 6/2002 |
| JP | 2002-358732 | 12/2002 |
| JP | 2004-078427 | 3/2004 |
| WO | WO 01/76256 | 10/2001 |

OTHER PUBLICATIONS

Perkins et al., "RTP Payload for Redundant Audio Data," *Internet Engineering Task Force* (*Internet Draft—Work in Progress*), 9 pp. (Jun. 1997).

Schulzrinne et al., "RTP: A Transport Protocol for Real-Time Applications," *Internet Engineering Task Force* (*Internet Draft—Work in Progress*), 81 pp. (Nov. 2001).

Microsoft Corporation, "Advanced Systems Format (ASF) Specification," rev. Jan. 20, 2002, 104 pp. (Jun. 2004).

ISO/IEC, *International Standard ISO/IEC 13818-7: Information Technology—Generic coding of moving pictures and associated audio information—Part 7: Advanced Audio Coding* (*AAC*), pp. i-iii, 1-22, 86-92 (Dec. 1997).

ISO/IEC, *International Standard ISO/IEC 13818-1: Information Technology—Generic coding of moving pictures and associated audio information: Systems*, 171 pp. (Dec. 2000).

Advanced Television Systems Committee, *ATSC Standard: Digital Audio Compression* (*AC-3*), *Revision A*, pp. 1-54, 118-140 (Aug. 2001).

ISO/IEC, *International Standard ISO/IEC 11172-3: Information Technology—Coding of moving pictures and associated audio for digital storage media at up to about 1,5 Mbit/s—Part 3: Audio*, pp. ii-vi, 1-44 (Aug. 1993).

Notice of Rejection (English translation), JP Application No. 2005-116625, 6 pages, Dec. 25, 2009.

Notice of Rejection (English translation), JP Application No. 2005-116625, 9 pages, Dec. 7, 2010.

Notice on First Office Action (English translation), CN Application No. 200510067376.5, 7 pages, Oct. 31, 2008.

Notice of Second Office Action (English translation), CN Application No. 200510067376.5, 6 pages, Aug. 7, 2009.

Notice of Third Office Action (English translation), CN Application No. 200510067376.5, 8 pages, Jan. 8, 2010.

Notice of Fourth Office Action (English translation), CN Application No. 200510067376.5, 8 pages, Mar. 30, 2011.

Notice of Fifth Office Action (English translation), CN Application No. 200510067376.5, 9 pages, Sep. 23, 2011.

Examination Report, EPC Application No. 05102872.8, 5 pages, Jun. 2, 2010.

Minutes of Oral Proceedings, EP Application No. 05102872.8, 5 pages, Apr. 15, 2011.

Notice of Preliminary Rejection (English translation), KR Application No. 10-2005-30768, 3 pages, Jun. 20, 2011.

Examination Report from Indian Patent Application No. 864/DEL/2005, dated Dec. 11, 2013, 2 pages.

European Search Report from European Patent Application No. 05102872.8, dated Oct. 2, 2009, 3 pages.

* cited by examiner

DIGITAL MEDIA UNIVERSAL ELEMENTARY STREAM

RELATED APPLICATION INFORMATION

This application is a divisional of U.S. patent application Ser. No. 10/966,443, entitled "Digital Media Universal Elementary Stream," filed Oct. 15, 2004, which claims the benefit of U.S. Provisional Patent Application No. 60/562,671, entitled, "Mapping of Audio Elementary Stream," filed Apr. 14, 2004, and U.S. Provisional Patent Application No. 60/580,995, entitled, "Digital Media Universal Elementary Stream," filed Jun. 18, 2004, all of which are incorporated herein by reference.

TECHNICAL FIELD

The invention relates generally to digital media (e.g., audio, video, and/or still images, among others) encoding and decoding.

BACKGROUND

With the introduction of compact disks, digital video disks, portable digital media players, digital wireless networks, and audio and video delivery over the Internet, digital audio and video has become commonplace. Engineers use a variety of techniques to process digital audio and video efficiently while still maintaining the quality of the digital audio or video.

Digital audio information is processed as a series of numbers representing the audio information. For example, a single number can represent an audio sample, which is an amplitude value (i.e., loudness) at a particular time. Several factors affect the quality of the audio information, including sample depth, sampling rate, and channel mode.

Sample depth (or precision) indicates the range of numbers used to represent a sample. The more values possible for the sample, the higher the quality because the number can capture more subtle variations in amplitude. For example, an 8-bit sample has 256 possible values, while a 16-bit sample has 65,536 possible values. A 24-bit sample can capture normal loudness variations very finely, and can also capture unusually high loudness.

The sampling rate (usually measured as the number of samples per second) also affects quality. The higher the sampling rate, the higher the quality because more bandwidth can be represented. Some common sampling rates are 8,000, 11,025, 22,050, 32,000, 44,100, 48,000, and 96,000 samples/second.

Mono and stereo are two common channel modes for audio. In mono mode, audio information is present in one channel. In stereo mode, audio information is present in two channels usually labeled the left and right channels. Other modes with more channels such as 5.1 channel, 7.1 channel, or 9.1 channel surround sound are also commonly used. The cost of high quality audio information is high bitrate. High quality audio information consumes large amounts of computer storage and transmission capacity.

Many computers and computer networks lack the storage or resources to process raw digital audio and video. Encoding (also called coding or bitrate compression) decreases the cost of storing and transmitting audio or video information by converting the information into a lower bitrate. Encoding can be lossless (in which quality does not suffer) or lossy (in which analytic quality suffers—though perceived audio quality may not—but the bitrate reduction compared to lossless encoding is more dramatic). Decoding (also called decompression) extracts a reconstructed version of the original information from the encoded form.

In response to the demand for efficient encoding and decoding of digital media data, many audio and video encoder/decoder systems ("codecs") have been developed. For example, referring to FIG. 1, an audio encoder 100 takes input audio data 110 and encodes it to produce encoded audio output data 120 using one or more encoding modules. In FIG. 1, analysis module 130, frequency transformer module 140, quality reducer (lossy encoding) module 150 and lossless encoder module 160 are used to produce the encoded audio data 120. Controller 170 coordinates and controls the encoding process.

Existing audio codecs include Microsoft Corporation's Windows Media Audio ("WMA") codec. Some other codec systems are provided or specified by the Motion Picture Experts Group ("MPEG"), Audio Layer 3 ("MP3") standard, the MPEG-2 Advanced Audio Coding ["AAC"] standard, or by other commercial providers such as Dolby (which has provided the AC-2 and AC-3 standards).

Different encoding systems use specialized elementary bitstreams for inclusion in multiplex streams capable of carrying more than one elementary bitstream. Such multiplex streams are also known as transport streams. Transport streams typically place certain restrictions on elementary streams, such as buffer size limitations, and require certain information to be included in the elementary streams to facilitate decoding. Elementary streams typically include an access unit to facilitate synchronization and accurate decoding of the elementary stream, and provide identification for different elementary streams within the transport stream.

For example, Revision A of the AC-3 standard describes an elementary stream composed of a sequence of synchronization frames. Each synchronization frame contains a synchronization information header, a bitstream information header, six coded audio data blocks, and an error check field. The synchronization information header contains information for acquiring and maintaining synchronization in the bitstream. The synchronization information includes a synchronization word, a cyclic redundancy check word, sample rate information and frame size information. The bitstream information header follows the synchronization information header. The bitstream information includes coding mode information (e.g., number and type of channels), time code information, and other parameters.

The AAC standard describes Audio Data Transport Stream (ADTS) frames that consist of a fixed header, a variable header, an optional error check block, and raw data blocks. The fixed header contains information that does not change from frame to frame (e.g., a synchronization word, sampling rate information, channel configuration information, etc.), but is still repeated for each frame to allow random access into the bitstream. The variable header contains data that changes from frame to frame (e.g., frame length information, buffer fullness information, number of raw data blocks, etc.) The error check block includes the variable crc_check for cyclic redundancy checking.

Existing transport streams include the MPEG-2 system or transport stream. The MPEG-2 transport stream can include multiple elementary streams, such as one or more AC-3 streams. Within the MPEG-2 transport stream, an AC-3 elementary stream is identified by at least a stream_type variable, a stream_id variable, and an audio descriptor. The audio descriptor includes information for individual AC-3 streams, such as bitrate, number of channels, sample rate, and a descriptive text field.

For additional more information about the codec systems, see the respective standards or technical publications.

SUMMARY

In summary, the detailed description is directed to various techniques and tools for digital media encoding and decoding, such as audio streams. The described techniques and tools include techniques and tools for mapping digital media data (e.g., audio, video, still images, and/or text, among others) in a given format to a transport or file container format useful for encoding the data on optical disks such as digital video disks (DVDs).

The description details a digital media universal elementary stream that can be used by these techniques and tools to map digital media streams (e.g., an audio stream, video stream or an image) into any arbitrary transport or file container, including not only optical disk formats, but also other transports, such as broadcast streams, wireless transmissions, etc. Described digital media universal elementary streams carry the information required to decode a stream in the stream itself. Further, the information to decode any given frame of the digital media in the stream can be carried in each coded frame.

A digital media universal elementary stream includes stream components called chunks. An implementation of a digital media universal elementary stream arranges data for a media stream in frames, the frames having one or more chunks. Chunks comprise a chunk header, which comprises a chunk type identifier, and chunk data, although chunk data may not be present for certain chunk types, such as chunk types in which all the information for the chunk is present in the chunk header (e.g., an end of block chunk). In some implementations, a chunk is defined as a chunk header and all subsequent information up to the start of the next chunk header.

In one implementation, a digital media universal elementary stream incorporates an efficient coding scheme using chunks, including a sync chunk with sync pattern and length fields. Some implementations encode a stream using optional elements, on a "positive check-in" basis. In one implementation, an end of block chunk can be used alternately with sync pattern/length fields to denote the end of a stream frame. Further, in some stream frames, both the sync pattern/length chunk and end of block chunk can be omitted. The sync pattern/length chunk and end of block chunk therefore also are optional elements of the stream.

In one implementation, a frame can carry information called a stream properties chunk that defines the media stream and its characteristics. Accordingly, a basic form of the elementary stream can be composed of simply a single instance of the stream properties chunk to specify codec properties, and a stream of media payload chunks. This basic form is useful for low-latency or low-bitrate applications, such as voice or other real-time media streaming applications.

A digital media universal elementary stream also includes extension mechanisms that allow extension of the stream definition to encode later-defined codecs or chunk types, without breaking compatibility for prior decoder implementations. A universal elementary stream definition is extensible in that new chunk types can be defined using chunk type codes that previously had no semantic meaning, and universal elementary streams containing such newly defined chunk types remain parse-able by existing or legacy decoders of the universal elementary stream. The newly defined chunks may be "length provided" (where the length of the chunk is encoded in a syntax element of the chunk) or "length pre-defined" (where the length is implied from the chunk type code). The newly defined chunks then can be "thrown away" or ignored by the parsers of existing legacy decoders, without losing bitstream parsing or scansion.

DETAILED DESCRIPTION

Described embodiments relate to techniques and tools for digital media encoding and decoding, and more particularly to codecs using a digital media universal elementary stream that can be mapped to arbitrary transport or file containers. The described techniques and tools include techniques and tools for mapping audio data in a given format to a format useful for encoding audio data on optical disks such as digital video disks (DVDs) and other transports or file containers. In some implementations, digital audio data is arranged in an intermediate format suitable for later translation and storage in a DVD format. The intermediate format can be, for example, a Windows Media Audio (WMA) format, and more particularly, a representation of the WMA format as a universal elementary stream described below. The DVD format can be, for example, a DVD audio recording (DVD-AR) format, or a DVD compressed audio (DVD-A CA) format. Although the specific application of these techniques to audio streams is illustrated, the techniques also can be used to encode/decode other forms of digital media, including without limitation video, still images, text, hypertext, and multiple media, among others.

The various techniques and tools can be used in combination or independently. Different embodiments implement one or more of the described techniques and tools.

I. Computing Environment

Figure 1:
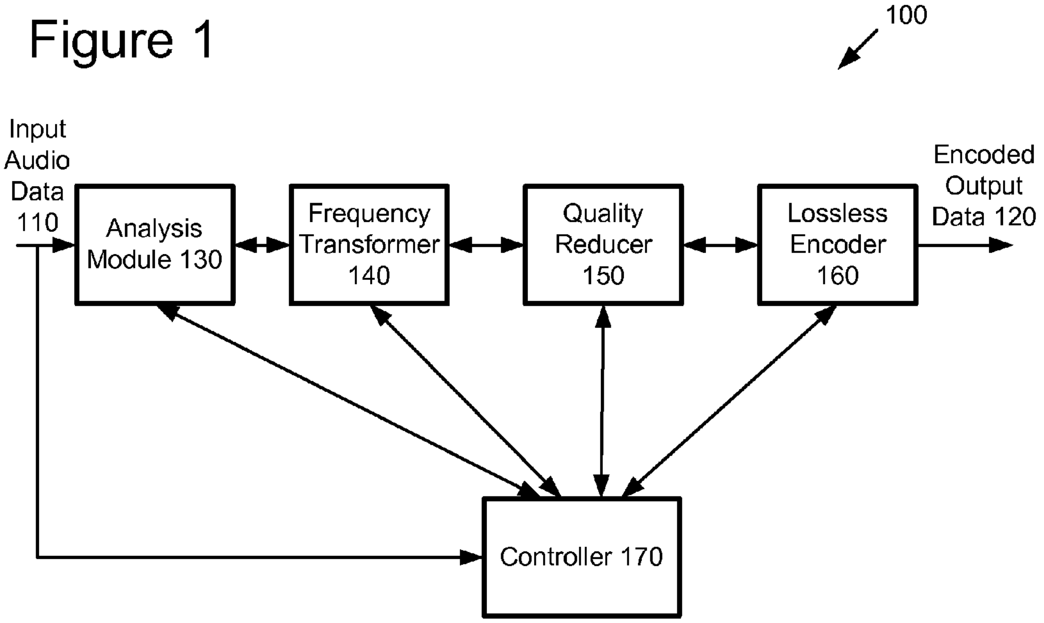
FIG. 1 is a block diagram of an audio encoder system according to the prior art.

The described universal elementary stream and transport mapping embodiments can be implemented on any of a variety of devices in which digital media and audio signal processing is performed, including among other examples, computers; digital media playing, transmission and receiving equipment; portable media players; audio conferencing; Web media streaming applications; and etc. The universal elementary stream and transport mapping can be implemented in hardware circuitry (e.g., in circuitry of an ASIC, FPGA, etc.), as well as in digital media or audio processing software executing within a computer or other computing environment (whether executed on the central processing unit (CPU), or digital signal processor, audio card or like), such as shown in FIG. 1.

Figure 2:
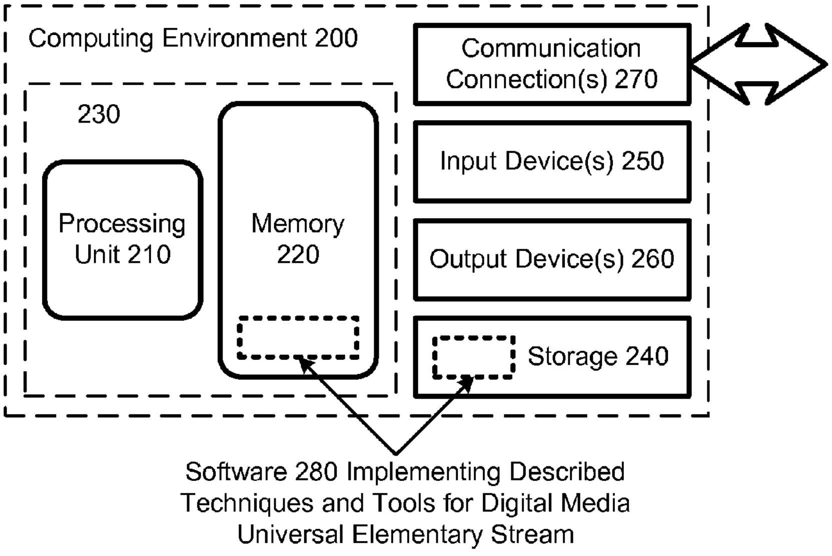
FIG. 2 is a block diagram of a suitable computing environment.

FIG. 2 illustrates a generalized example of a suitable computing environment (200) in which described embodiments may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing an audio encoder or decoder.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing the audio encoder or decoder.

The input device(s) (250) may be a touch input device such as a keyboard, mouse, pen, or trackball, a voice input device, a scanning device, or another device that provides input to the computing environment (200). For audio, the input device(s) (250) may be a sound card or similar device that accepts audio input in analog or digital form, or a CD-ROM or CD-RW that provides audio samples to the computing environment. The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, compressed audio or video information, or other data in a data signal (e.g., a modulated data signal). A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

II. Generalized Audio Encoder and Decoder

In some implementations, digital audio data is arranged in an intermediate format suitable for later mapping to a transport or file container. Audio data can be arranged in such an intermediate format via an audio encoder, and subsequently decoded by an audio decoder.

Figure 3:
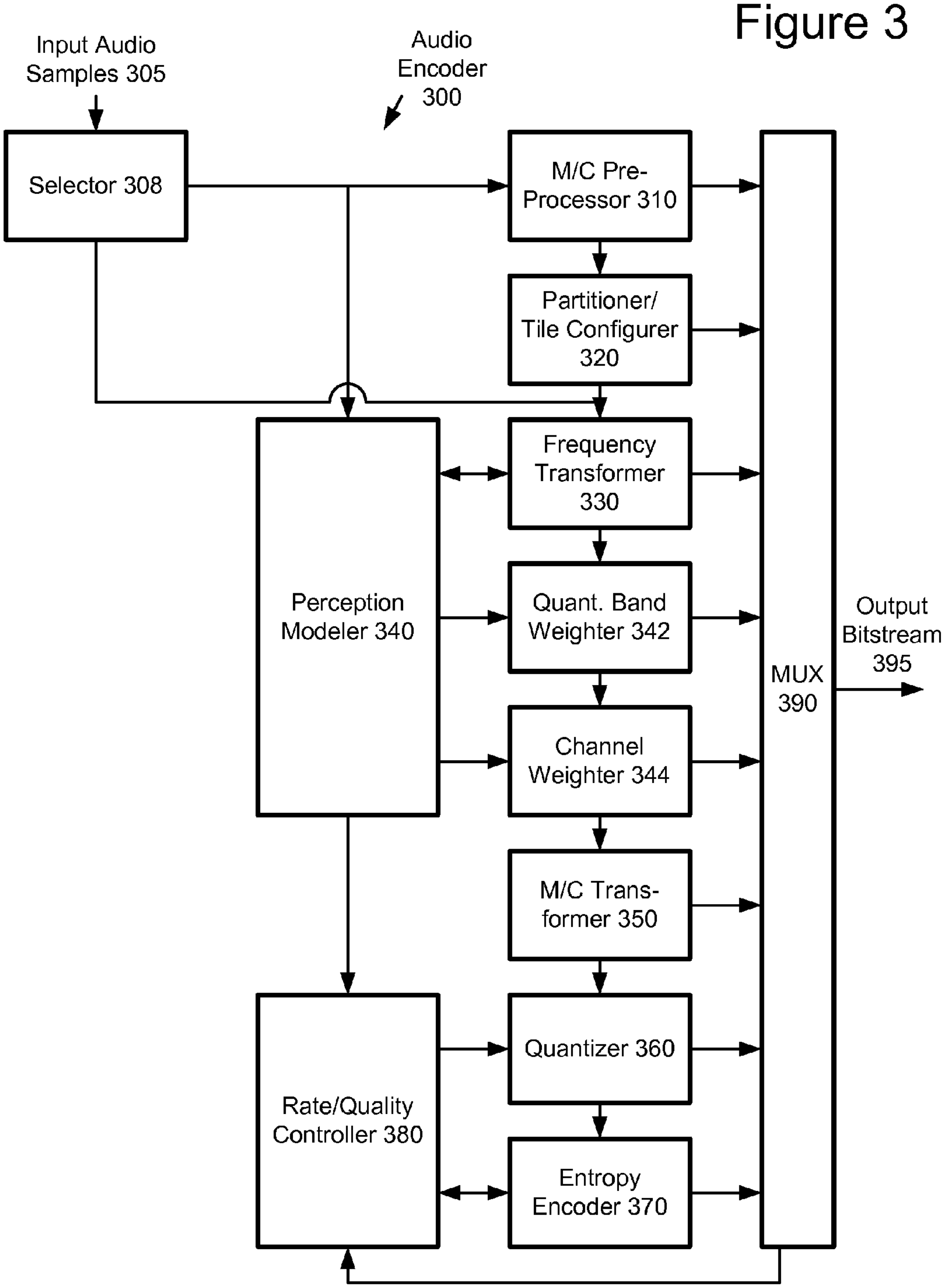
FIG. 3 is a block diagram of a generalized audio encoder system.
Figure 4:
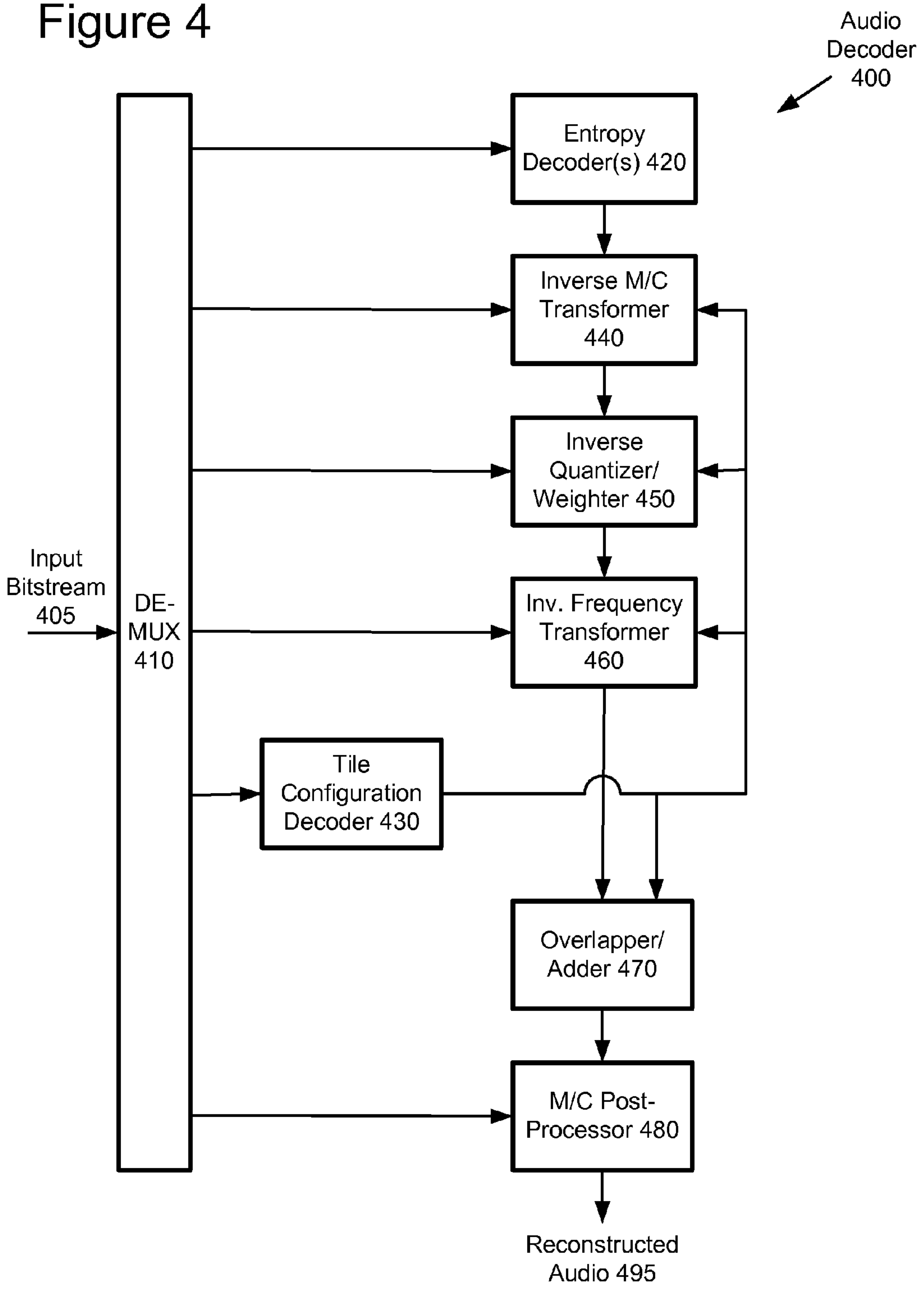
FIG. 4 is a block diagram of a generalized audio decoder system.

FIG. 3 is a block diagram of a generalized audio encoder (300) and FIG. 4 is a block diagram of a generalized audio decoder (400). The relationships shown between modules within the encoder and decoder indicate the main flow of information in the encoder and decoder; other relationships are not shown for the sake of simplicity. Depending on implementation and the type of compression desired, modules of the encoder or decoder can be added, omitted, split into multiple modules, combined with other modules, and/or replaced with like modules.

A. Audio Encoder

With reference to FIG. 3, an exemplary audio encoder (300) includes a selector (308), a multi-channel pre-processor (310), a partitioner/tile configurer (320), a frequency transformer (330), a perception modeler (340), a weighter (342), a multi-channel transformer (350), a quantizer (360), an entropy encoder (370), a controller (380), and a bitstream multiplexer ["MUX"] (390).

The encoder (300) receives a time series of input audio samples (305) at some sampling depth and rate in pulse code modulated ["PCM"] format. The encoder (300) compresses the audio samples (305) and multiplexes information produced by the various modules of the encoder (300) to output a bitstream (395) in a format such as a Microsoft Windows Media Audio ["WMA"] format.

The selector (308) selects encoding modes (e.g., lossless or lossy modes) for the audio samples (305). The lossless coding mode is typically used for high quality (and high bitrate) compression. The lossy coding mode includes components such as the weighter (342) and quantizer (360) and is typically used for adjustable quality (and controlled bitrate) compression. The selection decision at the selector (308) depends upon user input or other criteria.

For lossy coding of multi-channel audio data, the multi-channel pre-processor (310) optionally re-matrixes the time-domain audio samples (305). The multi-channel pre-processor (310) may send side information such as instructions for multi-channel post-processing to the MUX (390).

The partitioner/tile configurer (320) partitions a frame of audio input samples (305) into sub-frame blocks (i.e., windows) with time-varying size and window shaping functions. The sizes and windows for the sub-frame blocks depend upon detection of transient signals in the frame, coding mode, as well as other factors. When the encoder (300) uses lossy coding, variable-size windows allow variable temporal resolution. The partitioner/tile configurer (320) outputs blocks of partitioned data to the frequency transformer (330) and outputs side information such as block sizes to the MUX (390). The partitioner/tile configurer (320) can partition frames of multi-channel audio on a per-channel basis.

The frequency transformer (330) receives audio samples and converts them into data in the frequency domain. The frequency transformer (330) outputs blocks of frequency coefficient data to the weighter (342) and outputs side information such as block sizes to the MUX (390). The frequency transformer (330) outputs both the frequency coefficients and the side information to the perception modeler (340).

The perception modeler (340) models properties of the human auditory system to improve the perceived quality of the reconstructed audio signal for a given bitrate. Generally, the perception modeler (340) processes the audio data according to an auditory model, then provides information to the quantization band weighter (342) which can be used to generate weighting factors for the audio data. The perception modeler (340) uses any of various auditory models and passes excitation pattern information or other information to the weighter (342).

The weighter (342) generates weighting factors for quantization matrices based upon the information received from the perception modeler (340) and applies the weighting factors to the data received from the frequency transformer (330). The weighting factors for a quantization matrix include a weight for each of multiple quantization bands in the audio data. The quantization band weighter (342) outputs weighted blocks of coefficient data to the channel weighter (344) and outputs side information such as the set of weighting factors to the MUX (390). The set of weighting factors can be compressed for more efficient representation.

The channel weighter (344) generates channel-specific weight factors (which are scalars) for channels based on the information received from the perception modeler (340) and also on the quality of locally reconstructed signal. The channel weighter (344) outputs weighted blocks of coefficient data to the multi-channel transformer (350) and outputs side information such as the set of channel weight factors to the MUX (390).

For multi-channel audio data, the multiple channels of noise-shaped frequency coefficient data produced by the channel weighter (344) often correlate, so the multi-channel transformer (350) may apply a multi-channel transform. The multi-channel transformer (350) produces side information to the MUX (390) indicating, for example, the multi-channel transforms used and multi-channel transformed parts of tiles.

The quantizer (360) quantizes the output of the multi-channel transformer (350), producing quantized coefficient data to the entropy encoder (370) and side information including quantization step sizes to the MUX (390).

The entropy encoder (370) losslessly compresses quantized coefficient data received from the quantizer (360). The entropy encoder (370) can compute the number of bits spent encoding audio information and pass this information to the rate/quality controller (380).

The controller (380) works with the quantizer (360) to regulate the bitrate and/or quality of the output of the encoder (300). The controller (380) receives information from other modules of the encoder (300) and processes the received information to determine desired quantization factors given current conditions. The controller (380) outputs the quantization factors to the quantizer (360) with the goal of satisfying quality and/or bitrate constraints.

The MUX (390) multiplexes the side information received from the other modules of the audio encoder (300) along with the entropy encoded data received from the entropy encoder (370). The MUX (390) may include a virtual buffer that stores the bitstream (395) to be output by the encoder (300). The current fullness and other characteristics of the buffer can be used by the controller (380) to regulate quality and/or bitrate.

B. Audio Decoder

With reference to FIG. 4, a corresponding audio decoder (400) includes a bitstream demultiplexer ["DEMUX"] (410), one or more entropy decoders (420), a tile configuration decoder (430), an inverse multi-channel transformer (440), a inverse quantizer/weighter (450), an inverse frequency transformer (460), an overlapper/adder (470), and a multi-channel post-processor (480). The decoder (400) is somewhat simpler than the encoder (300) because the decoder (400) does not include modules for rate/quality control or perception modeling.

The decoder (400) receives a bitstream (405) of compressed audio information in a WMA format or another format. The bitstream (405) includes entropy encoded data as well as side information from which the decoder (400) reconstructs audio samples (495).

The DEMUX (410) parses information in the bitstream (405) and sends information to the modules of the decoder (400). The DEMUX (410) includes one or more buffers to compensate for variations in bitrate due to fluctuations in complexity of the audio, network jitter, and/or other factors.

The one or more entropy decoders (420) losslessly decompress entropy codes received from the DEMUX (410). The entropy decoder (420) typically applies the inverse of the entropy encoding technique used in the encoder (300). For the sake of simplicity, one entropy decoder module is shown in FIG. 4, although different entropy decoders may be used for lossy and lossless coding modes, or even within modes. Also, for the sake of simplicity, FIG. 4 does not show mode selection logic. When decoding data compressed in lossy coding mode, the entropy decoder (420) produces quantized frequency coefficient data.

The tile configuration decoder (430) receives and, if necessary, decodes information indicating the patterns of tiles for frames from the DEMUX (410). The tile configuration decoder (430) then passes tile pattern information to various other modules of the decoder (400).

The inverse multi-channel transformer (440) receives the quantized frequency coefficient data from the entropy decoder (420) as well as tile pattern information from the tile configuration decoder (430) and side information from the DEMUX (410) indicating, for example, the multi-channel transform used and transformed parts of tiles. Using this information, the inverse multi-channel transformer (440) decompresses the transform matrix as necessary, and selectively and flexibly applies one or more inverse multi-channel transforms to the audio data.

The inverse quantizer/weighter (450) receives tile and channel quantization factors as well as quantization matrices from the DEMUX (410) and receives quantized frequency coefficient data from the inverse multi-channel transformer (440). The inverse quantizer/weighter (450) decompresses the received quantization factor/matrix information as necessary, then performs the inverse quantization and weighting.

The inverse frequency transformer (460) receives the frequency coefficient data output by the inverse quantizer/weighter (450) as well as side information from the DEMUX (410) and tile pattern information from the tile configuration decoder (430). The inverse frequency transformer (460) applies the inverse of the frequency transform used in the encoder and outputs blocks to the overlapper/adder (470).

In addition to receiving tile pattern information from the tile configuration decoder (430), the overlapper/adder (470) receives decoded information from the inverse frequency transformer (460). The overlapper/adder (470) overlaps and adds audio data as necessary and interleaves frames or other sequences of audio data encoded with different modes.

The multi-channel post-processor (480) optionally re-matrixes the time-domain audio samples output by the overlapper/adder (470). The multi-channel post-processor selectively re-matrixes audio data to create phantom channels for playback, perform special effects such as spatial rotation of channels among speakers, fold down channels for playback on fewer speakers, or for any other purpose. For bitstream-controlled post-processing, the post-processing transform matrices vary over time and are signaled or included in the bitstream (405).

For more information on WMA audio encoders and decoders, see U.S. patent application Ser. No. 10/642,550, entitled "MULTI-CHANNEL AUDIO ENCODING AND DECODING," published as U.S. Patent Application Publication No. 2004-0049379, filed Aug. 15, 2003; and U.S. patent application Ser. No. 10/642,551, entitled "QUANTIZATION AND INVERSE QUANTIZATION FOR AUDIO," published as U.S. Patent Application Publication No. 2004-0044527, filed Aug. 15, 2003, which are hereby incorporated herein by reference.

III. Innovations in Mapping of Audio Elementary Streams

Described techniques and tools include techniques and tools for mapping an audio elementary stream in a given intermediate format (such as the below-described universal elementary stream format) into a transport or other file container format suitable for storage and playback on an optical disk (such as a DVD). The descriptions and drawings herein show and describe bitstream formats and semantics and techniques for mapping between formats.

In implementations described herein, a digital media universal elementary stream uses stream components called chunks to encode the stream. For example, an implementation of a digital media universal elementary stream arranges data for a media stream in frames, the frames having one or more chunks of one or more types, such as a sync chunk, a format header/stream properties chunk, an audio data chunk comprising compressed audio data (e.g., WMA Pro audio data) a metadata chunk, a cyclic redundancy check chunk, a time stamp chunk, an end of block chunk, and/or some other type of existing chunk or future-defined chunk. Chunks comprise a chunk header (which can include, for example, a one-byte chunk type syntax element) and chunk data, although chunk data may not be present for certain chunk types, such as chunk types in which all the information for the chunk is present in the chunk header (e.g., an end of block chunk). In some implementations, a chunk is defined as a chunk header and all information (e.g., chunk data) up to the start of a subsequent chunk header.

Figure 5:
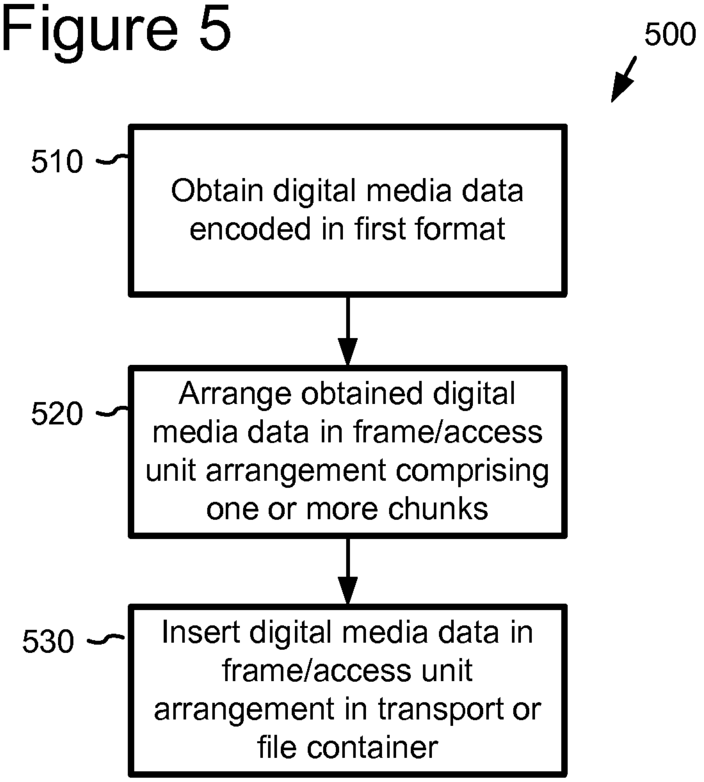
FIG. 5 is a flow chart showing a technique for mapping digital media data in a first format to a transport or file container using a frame or access unit arrangement comprising one or more chunks.

For example, FIG. 5 shows a technique 500 for mapping digital media data in a first format to a transport or file container using a frame or access unit arrangement comprising one or more chunks. At 510, digital media data encoded in first format is obtained. At 520, the obtained digital media data is arranged in a frame/access unit arrangement comprising one or more chunks. Then, at 530, the digital media data in frame/access unit arrangement is inserted in a transport or file container.

Figure 6:
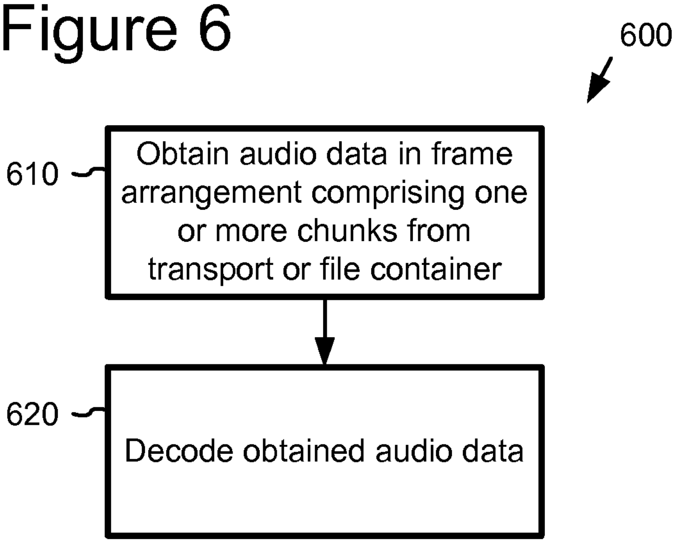
FIG. 6 is flow chart showing a technique for decoding digital media data in a frame or access unit arrangement comprising one or more chunks obtained from a transport or file container.

FIG. 6 shows a technique 600 for decoding digital media data in a frame or access unit arrangement comprising one or more chunks obtained from a transport or file container. At 610, audio data in frame arrangement comprising one or more chunks is obtained from a transport or file container. Then, at 620, the obtained audio data is decoded.

In one implementation, a universal elementary stream format is mapped to a DVD-AR zone format. In another implementation, a universal elementary stream format is mapped to a DVD-CA zone format. In another implementation, a universal elementary stream format is mapped to an arbitrary transport or file container. In such implementations, a universal elementary stream format is considered an intermediate format because the described techniques and tools can transcode or map data in this format into a subsequent format suitable for storage on an optical disk.

In some implementations, a universal audio elementary stream is a variant of the Windows Media Audio (WMA) format. For more information on WMA formats, see U.S. Provisional Patent Application No. 60/488,508, entitled "Lossless Audio Encoding and Decoding Tools and Techniques," filed Jul. 18, 2003, and U.S. Provisional Patent Application No. 60/488,727, entitled "Audio Encoding and Decoding Tools and Techniques," filed Jul. 18, 2003, which are incorporated herein by reference.

In general, digital information can be represented as a series of data objects (such as access units, chunks or frames) to facilitate processing and storing the digital information. For example, a digital audio or video file can be represented as a series of data objects that contain digital audio or video samples.

When a series of data objects represents digital information, processing the series is simplified if the data objects are equal size. For example, suppose a sequence of equal-size audio access units is stored in a data structure. Using an ordinal number of an access unit in the sequence, and knowing the size of access units in the sequence, a particular access unit can be accessed as an offset from the beginning of the data structure.

In some implementations, an audio encoder such as the encoder (300) shown above in FIG. 3 encodes audio data in an intermediate format such as a universal elementary stream format. An audio data mapper or transcoder can then be used to map the stream in the intermediate format to a format suitable for storage on an optical disk (such as a format having access units of fixed size). One or more audio decoders such as the decoder (400) shown above in FIG. 4 can then decode the encoded audio data.

For example, audio data in a first format (e.g., a WMA format) is mapped to second format (e.g., a DVD-AR or DVD A-CA format). First, audio data encoded in the first format is obtained. In the first format, the obtained audio data is arranged in a frame having either a fixed size or a maximum allowable size (e.g., 2011 bytes when mapping to a DVD-AR format, or some other maximum size). The frame can include chunks such as a sync chunk, a format header/stream properties chunk, an audio data chunk comprising compressed WMA Pro audio data, a metadata chunk, a cyclic redundancy check chunk, an end of block chunk, and/or some other type of existing chunk or future-defined chunk. This arrangement allows a decoder (such as a digital audio/video decoder) to access and decode the audio data. This arrangement of audio data is then inserted in an audio data stream in the second format. The second format is a format for storing audio data on a computer-readable optical data storage disk (e.g., a DVD).

The synchronization chunk can include a synchronization pattern and a length field for verifying whether a particular synchronization pattern is valid. The end of an elementary stream frame can alternately be signaled with an end of block chunk. Further, both the synchronization chunk and end of block chunk (or potentially other types of chunks) can be omitted in a basic form of the elementary stream, such as may be useful in real-time applications.

Details for specific chunk types in some implementations are provided below.

IV. Implementations Mapping a Universal Elementary Stream to DVD Audio Formats

The following example details the mapping of a universal elementary stream format representation of a WMA Pro coded audio stream over DVD-AR and DVD-A CA zones. In this example, the mapping is done to meet requirements of a DVD-CA zone where WMA Pro has been accepted as an optional codec, and to meet requirements of a DVD-AR specification where WMA Pro is included as an optional codec.

Figure 7:
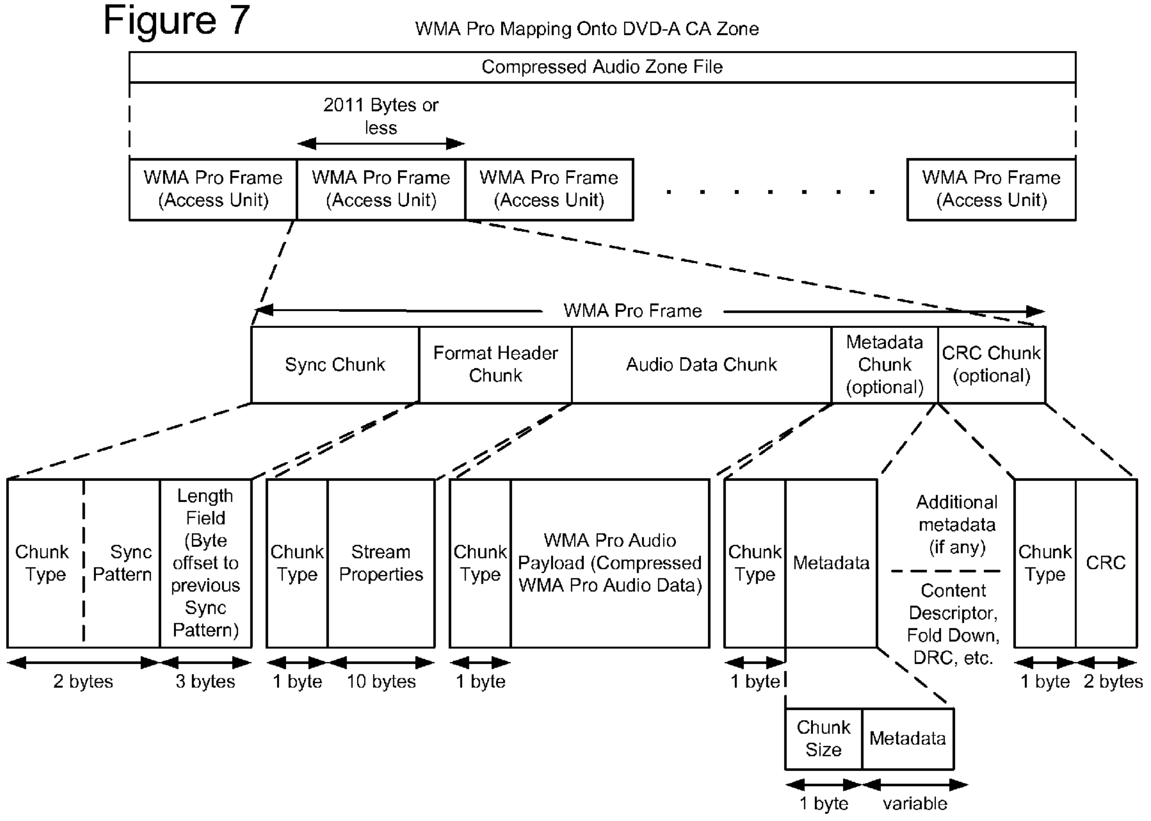
FIG. 7 depicts an exemplary mapping of a WMA Pro audio elementary stream into DVD-A CA format.
Figure 8:
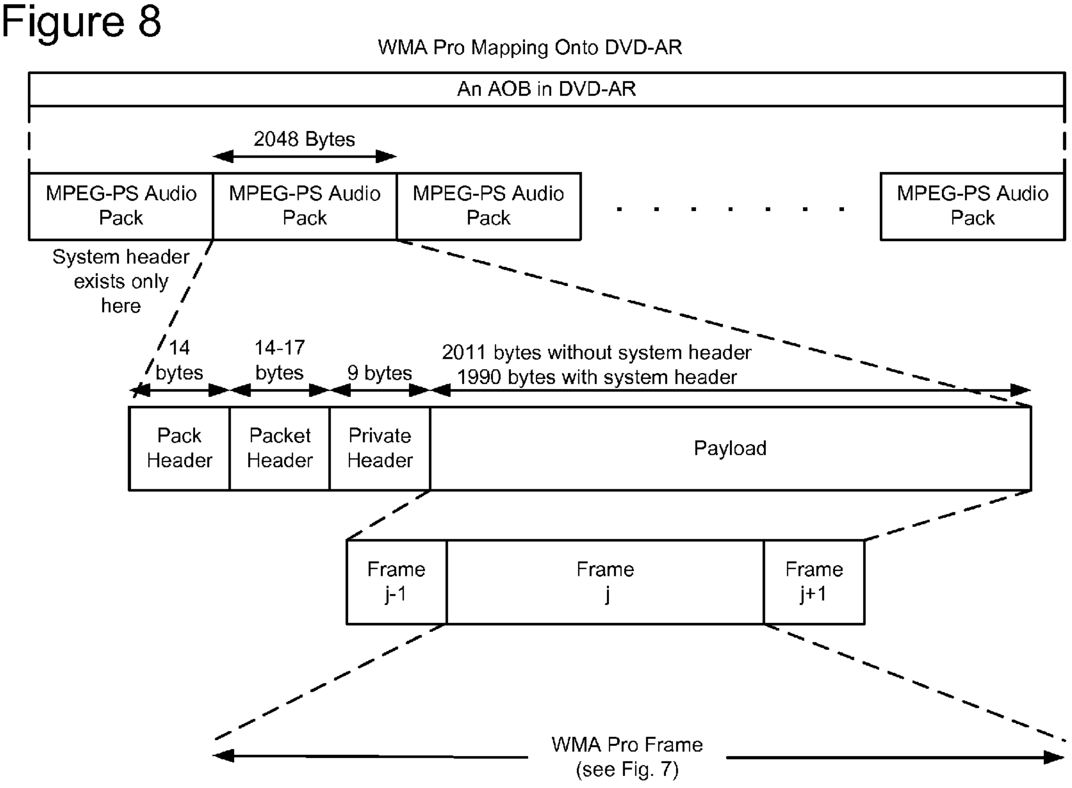
FIG. 8 depicts an exemplary mapping of a WMA Pro audio elementary stream into DVD-AR format.

FIG. 7 depicts the mapping of a WMA Pro stream into DVD-A CA zone. FIG. 8 depicts the mapping of a WMA Pro stream into an audio object (AOB) in DVD-AR. In the examples shown in these figures, information required to decode a given WMA Pro frame is carried in access units or WMA Pro frames. In FIGS. 7 and 8, the stream properties header, which comprises 10 bytes of data, is constant for a given stream. Stream properties information can be carried in, for example, a WMA Pro frame or access unit. Alternatively, stream properties information can be carried in a stream properties header in a CA Manager for CA zone or in either a Packet Header or Private Header of DVD-AR PS.

Specific bitstream elements shown in FIGS. 7 and 8 are described below:

Stream Properties: Defines a media stream and its characteristics. The stream properties header largely contains data which is constant for a given stream. More details on the stream properties are provided in Table 1 below:

TABLE 1

Stream Properties

| Bit position | Field name | Field Description |
|---|---|---|
| 0-2 | VersNum | Version number of the WMA bit-stream |
| 3-6 | BPS | Bit depth of the decoded audio samples (Q Index) |
| 7-10 | cChan | Number of audio channels |
| 11-15 | SampRt | Sampling rate of the decoded audio |
| 16-31 | CMap | Channel Map |
| 32-47 | EncOpt | Encoder options structure |
| 48-50 | Profile Support | Field describing the encoding profile that this stream belongs to (M1, M2, M3) |
| 51-54 | Bit-Rate | Bit rate of encoded stream in Kbps |
| 55-79 | Reserved | Reserved - Set to 0 |

Chunk Type: A single byte chunk header. In this example, the chunk type field precedes every type of data chunk. The chunk type field carries a description of the data chunk to follow.

Sync Pattern: In this example, this is a 2-byte sync pattern to enable a parser to seek to the beginning of a WMA Pro frame. The chunk type is embedded in the first byte of the sync pattern.

Length Field: In this example, the length field indicates the offset to the beginning of the previous sync code. The sync pattern combined with the length field provides a sufficiently unique combination of information to prevent emulation. When a reader comes across a sync pattern, it parses forward to the next sync pattern and verifies that the length specified in the second sync pattern corresponds to the length in bytes it has parsed in order to reach the second sync pattern from the first. If this is verified, the parser has encountered a valid sync pattern and it can start decoding. Or, a decoder can "speculatively" start decoding from the first sync pattern it finds, rather than waiting for the next sync pattern. In this way, a decoder can perform playback of some samples before parsing and verifying the next sync pattern.

Metadata: Carries information on the type & size of metadata. In this example, metadata chunks include: 1 byte indicating the type of metadata; 1 byte indicating the chunk size N in bytes (metadata >256 bytes transmitted as multiple chunks with the same ID); an N-byte chunk; and encoder output zero byte for ID tag when there is no more metadata.

Content Descriptor Metadata: In this example, the metadata chunk provides a low-bit-rate channel for the communication of basic descriptive information relating to the content of the audio stream. The content descriptor metadata is 32 bits long. This field is optional and if necessary could be repeated (e.g., once every 3 seconds) to conserve bandwidth. More details on content descriptor metadata are provided in Table 2 below:

TABLE 2

Content Descriptor Metadata

| Bit position | Field name | Field description | | |
|---|---|---|---|---|
| 0 | Start | When this bit is set, it flags the start of the metadata. | | |
| 1-2 | Type | This field identifies the contents of the current metadata string. Values are: | | |
| | | Bit1 | Bit2 | String Description |
| | | 0 | 0 | Title |
| | | 0 | 1 | Artist |
| | | 1 | 0 | Album |
| | | 1 | 1 | Undefined (free text) |
| 3-7 | Reserved | Should be set to 0. | | |
| 8-15 | Byte0 | First byte of the metadata. | | |
| 16-23 | Byte1 | Second byte of the metadata. | | |
| 24-31 | Byte2 | Third byte of the metadata. | | |

The actual content descriptor strings are assembled by the receiver from the byte stream contained in the metadata. Each byte in the stream represents a UTF-8 character. Metadata can be padded with 0x00 if the metadata string ends before the end of a block. The beginning and end of a string are implied by transitions in the "Type" field. Because of this, transmitters cycle through all four types when sending content descriptor metadata—even if one or more of the strings is empty.

CRC (Cyclic Redundancy Check): CRC covers everything starting after the previous CRC or at and including the previous sync pattern, whichever is nearer, up to but not including the CRC itself.

Presentation Time Stamp: Although not shown in FIGS. 7 and 8, the presentation time stamp carries the time stamp information to synchronize with a video stream whenever necessary. In this example, it is specified as 6 bytes to support 100 nanosecond granularities. For example, to accommodate the presentation time stamp in the DVD-AR specification, an appropriate location to carry it would be in the Packet Header.

V. Another Universal Elementary Stream Definition

Figure 9:
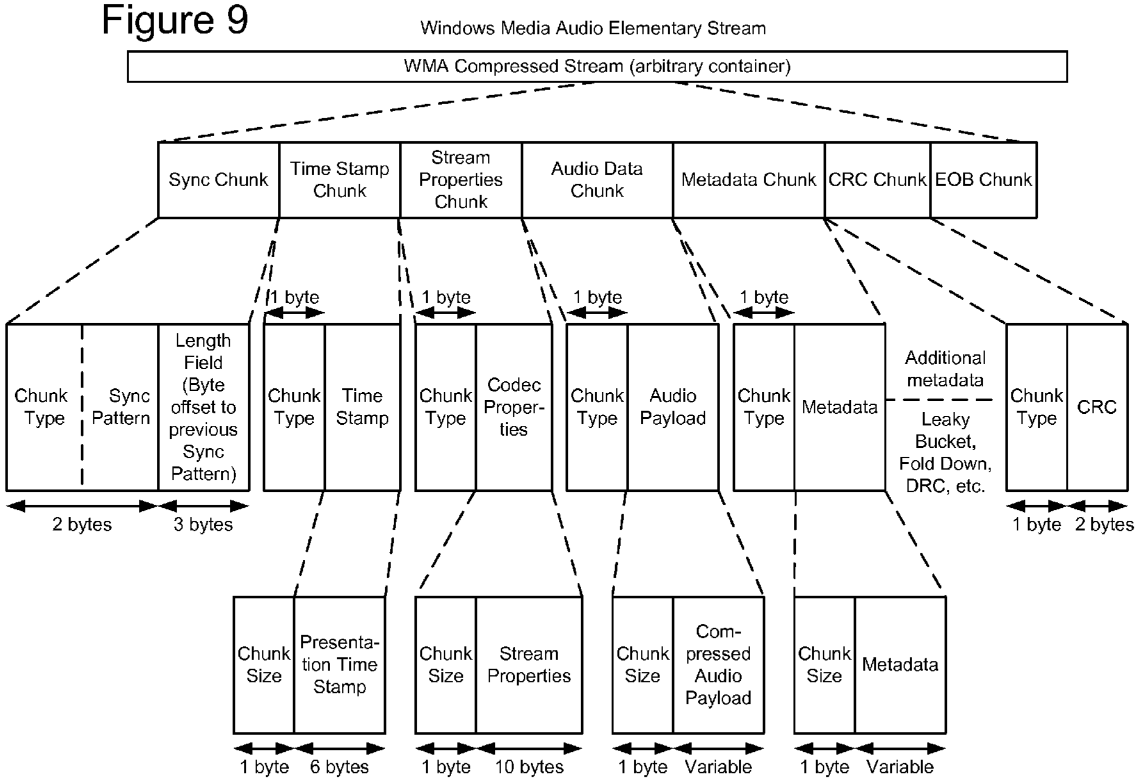
FIG. 9 depicts a definition of a universal elementary stream for mapping into an arbitrary container.

FIG. 9 illustrates another definition of a universal elementary stream, which can be used as the intermediate format of WMA audio streams mapped in the above examples to DVD audio formats. More broadly, the universal elementary stream defined in this example can be used to map other varieties of digital media streams into any arbitrary transport or file container.

In the universal elementary stream described in this example, the digital media is encoded as a sequence of discrete frames of the digital media (e.g., a WMA audio frame). The universal elementary stream encodes the digital media stream in such a way as to carry all of the information required to decode any given frame of the digital media from the frame itself.

Following is a description of the header components in a stream frame shown in FIG. 9.

Chunk Type: In this example, chunk type is a single byte header which precedes every type of data chunk. The chunk type field carries a description of the data chunk to follow. The elementary stream definition defines a number of chunk types, which includes an escape mechanism to allow the elementary stream definition to be supplemented or extended with additional, later defined chunk types. The newly defined chunks may be "length provided" (where the length of the chunk is encoded in a syntax element of the chunk) or "length predefined" (where the length is implied from the chunk type code). The newly defined chunks then can be "thrown away" or ignored by the parsers of existing legacy decoders, without losing bitstream parsing or scansion. The logic behind the chunk type and its use is detailed in the next section.

Sync Pattern: This is a 2-byte sync pattern to enable a parser to seek to the beginning of an elementary stream frame. The chunk type is embedded in the first byte of the sync pattern. The exact pattern used in this example is detailed below.

Length Field: In this example, the length field indicates the offset to the beginning of the previous sync code. The Sync pattern combined with the Length field provides a sufficiently unique combination of information to prevent emulation. When a parser comes across a sync pattern, it parses the subsequent length field, parses to the next proximate sync pattern, and then verifies that the length specified in the second sync pattern corresponds to the length in bytes it has parsed to encounter the second sync pattern from the first. If that is the case, the parser has encountered a valid sync pattern and can start decoding. The Sync Pattern and Length Field may be omitted by the encoder for some frames, such as in low bit-rate scenarios. However, the encoder should omit both together.

Presentation Time Stamp: In this example, the presentation time stamp carries the time stamp information to synchronize with a video stream whenever necessary. In this illustrated elementary stream definition implementation, the presentation time stamp is specified as 6 bytes to support 100 nanosecond granularities. However, this field is preceded by a chunk size field, which specifies the length of the time stamp field.

In some implementations, the presentation time stamp field can be carried by the file container, e.g., the Microsoft Advanced Systems Format (ASF) or MPEG-2 Program Stream (PS) file container. The presentation time stamp field is included in the elementary stream definition implementation illustrated here to show that in the most elemental state the stream can carry all information required to decode and synchronize an audio stream with a video stream.

Stream Properties: This defines a media stream and its characteristics. More details on the stream properties in this example are provided below. The stream properties header need only be available at the beginning of the file as the data inside does not change per stream.

In some implementations, the stream properties field is carried by the file container, e.g., the ASF or MPEG-2 PS file container. The stream properties field is included in the elementary stream definition implementation illustrated here to show that in the most elemental state the stream can carry all information required to decode a given audio frame. If it is included in the elementary stream, this field is preceded by a chunk size field which specifies the length of the stream properties data.

Table 1 above shows stream properties for streams encoded with the WMA Pro codec. Similar stream property headers can be defined for each of the codecs.

Audio Data Payload: In this example, the audio data payload field carries the compressed digital media data, such as the compressed Windows Media Audio frame data. The elementary stream also can be used with digital media streams other than compressed audio, in which case the data payload is the compressed digital media data of such streams.

Metadata: This field carries information on the type and size of metadata. The types of metadata that can be carried include Content Descriptor, Fold Down, DRC etc. Metadata will be structured as follows:

In this example, each metadata chunk has:

1 byte indicating the type of metadata 1 byte indicating the chunk size N in bytes (metadata >256 bytes transmitted as multiple chunks with the same ID);

N-byte chunk

CRC: In this example, the cyclic redundancy check (CRC) field covers everything starting after the previous CRC or at and including the previous Sync pattern, whichever is nearer, up to but not including the CRC itself.

EOB: In this example, the EOB (end of block) chunk is used to signal the end of a given block or frame. If the sync chunk is present, an EOB is not required to end the previous block or frame. Likewise, if an EOB is present, a sync chunk is not necessary to define the start of the next block or frame. For low-rate streams, it is not necessary to carry either of these, if break-in and startup are not considerations.

A. Chunk Types

In this example, the Chunk ID (Chunk type) distinguishes the kind of data that is carried in a universal elementary stream. It is sufficiently flexible to be able to represent all the different codec types and associated codec data, including stream properties and any metadata while allowing for expansion of the elementary stream to carry audio, video, or other data types. The later added chunk types can use either LENGTH_PROVIDED or LENGTH_PREDEFINED class to indicate its length, which allows parsers of existing elementary stream decoders to skip such later defined chunks that the decoder has not been programmed to decode.

In the implementation of the elementary stream definition illustrated here, a single byte chunk type field is used to represent and distinguish all codec data. In this illustrated implementation, there are 3 classes of chunks as defined in Table 3 below.

TABLE 3

Tags for Chunk Classes

| Chunk Range | Kind of Tag |
|---|---|
| 0x00 thru 0x92 | LENGTH_PROVIDED |
| 0x93 thru 0xBF | LENGTH_AND_MEANING_PREDEFINED |
| 0xC0 thru 0xFF | LENGTH_PREDEFINED |
| 0x3F | Escape Code (For additional codecs) |
| 0x7F | Escape Code (For additional stream properties) |

For tags of LENGTH_PROVIDED class, the data is preceded by a length field which explicitly states the length of the following data. While the data may itself carry length indicators, the overall syntax defines a length field.

A table of elements in this class is shown below in Table 4:

TABLE 4

Elements of LENGTH_PROVIDED Class

| Chunk Type (Hex) | Data Stream | Stream Properties Tag (Hex) |
|---|---|---|
| 0x00 | PCM STREAM | 0x40 |
| 0x01 | WMA Voice | 0x41 |
| 0x02 | RT Voice | 0x42 |
| 0x03 | WMA Std | 0x43 |
| 0x04 | WMA+ | 0x44 |
| 0x05 | WMA Pro | 0x45 |
| 0x06 | WMA Lossless | 0x46 |
| 0x07 | PLEAC | 0x47 |
| . . . | . . . | |
| 0x3E | Additional Codecs | 0x7E |

A table of elements of metadata in the LENGTH_PROVIDED class is shown below in Table 5:

TABLE 5

Elements of Metadata in the LENGTH_PROVIDED Class

| Chunk Type (Hex) | Metadata |
|---|---|
| 0x80 | Content Descriptor Metadata |
| 0x81 | Fold Down |
| 0x82 | Dynamic Range Control |
| 0x83 | Multi Byte Fill Element |
| 0x84 | Presentation Time Stamp |
| . . . | . . . |
| 0x92 | Additional Metadata |

The LENGTH field element follows the LENGTH_PROVIDED class of tags. A table of elements of the LENGTH field is shown below in Table 6.

TABLE 6

Elements of LENGTH field following LENGTH_PROVIDED Tags

| First Bit of Field (MSB) | Length Definition |
|---|---|
| 0 | A 1 Byte length field. (MSB is bit 7)<br>The 7 LSBs (bits 6 through 0) indicate the size of the following data field in Bytes.<br>This is the most common size field used for all data except for certain audio payload. |
| 1 | A 3 Byte length field. (MSB is bit 23)<br>Bits 22 through 3 indicate the size of the following field in Bytes<br>Bits 2 through 0 indicate the number of audio frames, if the length field is used to define the size of an audio payload. |
| 1 | If the value of bits 22 through 3 is “FFFFF,” this denotes an escape code, and bits 2 through 0 are unconstrained. It is followed by 4 Bytes of size field which indicates additional size of payload in Bytes. The value FFFFF is added to the additional 4 byte unsigned long to get the total data length in bytes. |

For tags of LENGTH_AND_MEANING_PREDEFINED, Table 7 below defines the length of the field following the chunk type.

TABLE 7

Length of Field Following Chunk Type for LENGTH_AND_MEANING_PREDEFINED Tags.

| Chunk Type (Hex) | Name | Length |
|---|---|---|
| 0x93 | SYNC WORD | 5 Bytes |
| 0x94 | CRC | 2 Bytes |
| 0x95 | Single byte fill element | 1 Byte |
| 0x96 | END_OF_BLOCK | 1 Byte |
| . . . | . . . | . . . |
| 0xBF | (Additional tag definitiions) | XX |

For LENGTH_PREDEFINED tags, bits 5 through 3 of the chunk type defines the length of data that a decoder that does not understand that chunk type, or a decoder that does not need the data included for that chunk type, must skip after the chunk type, as shown in Table 8. The two most-significant bits of chunk type (i.e., bits 7 and 6)=11.

TABLE 8

Data Length Skipped After Chunk Type for LENGTH_PREDEFINED Tags.

| Chunk Type Bits 5 through 3 | Length of Data to Be Skipped (in Bytes) |
|---|---|
| 000 | 1 |
| 001 | 1 |
| 010 | 2 |
| 011 | 4 |
| 100 | 8 |
| 101 | 16 |
| 110 | 32 |
| 111 | 32 |

For 2-byte, 4-byte, 8-byte and 16-byte data, up to eight distinct tags are possible, represented by bits 2 through 0 of the chunk type. For 1-byte and 32-byte data, the number of possible tags is doubled to 16, because 1-byte and 32-byte data can each be represented in two ways (e.g., 000 or 001 for 1-byte and 110 or 111 for 32-byte in bits 5 through 3, as shown in Table 8, above).

B. Metadata Fields

Fold Down: This field contains information on fold down matrices for author controlled fold down scenarios. This is the field which carries the fold down matrix, the size of which can vary depending on the fold down combination that it carries. In the worst case the size would be an 8×6 matrix for fold down from 7.1 (8 channels, including subwoofer) to 5.1 (6 channels, including subwoofer). The fold down field is repeated in each access unit to cover the case where the fold down matrices vary over time.

DRC: This field contains DRC (Dynamic Range Control) information (e.g., DRC coefficients) for the file.

Content Descriptor Metadata: In this example, the metadata chunk provides a low-bit-rate channel for the communication of basic descriptive information relating to the content of the audio stream. The content descriptor metadata is 32 bits long. This field is optional and if necessary could be repeated once every three seconds to conserve bandwidth. More details on the content descriptor metadata are provided in Table 2, above.

The actual content descriptor strings are assembled by the receiver from the byte stream contained in the metadata. Each byte in the stream represents a UTF-8 character. Metadata can be padded with 0x00 if the metadata string ends before the end of a block. The beginning and end of a string are implied by transitions in the “Type” field. Because of this, transmitters cycle through all four types when sending content descriptor metadata—even if one or more of the strings is empty.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

We claim:

1. In a digital media system, a method of decoding audio data, the method comprising:

obtaining audio data encoded in a format for storing audio data on a computer-readable optical storage disk, the obtained audio data arranged in a plurality of frames each having a fixed size, wherein the obtained audio data has been transcoded from an intermediate format, and wherein each of the plurality of frames comprises a plurality of chunks associated with the intermediate format, the plurality of chunks comprising:

an audio data chunk comprising a first chunk type field that identifies the audio data chunk;

a metadata chunk comprising a second chunk type field that identifies the metadata chunk;

a synchronization chunk comprising a synchronization pattern element, a length field indicating an offset to the beginning of a previous synchronization pattern element, and a third chunk type field that identifies the synchronization chunk;

a time stamp chunk comprising time stamp data and a fourth chunk type field that identifies the time stamp chunk; and a cyclic redundancy check chunk comprising cyclic redundancy check data and a fifth chunk type field that identifies the cyclic redundancy check chunk; and decoding the obtained audio data.

2. The method of claim 1 wherein the intermediate format is a Windows Media Audio format, and wherein the format for storing audio data on a computer-readable optical data storage disk is a DVD format.

3. The method of claim 1 wherein at least one of the chunk type fields includes one or more bits that indicate a length of data that a decoder can skip after the respective chunk type field.

4. The method of claim 1 wherein the format for storing audio data on a computer-readable optical data storage disk is a compressed audio format.

5. The method of claim 1 wherein the format for storing audio data on a computer-readable optical data storage disk is an audio recording format.

6. The method of claim 1 wherein the metadata chunk further comprises information indicating metadata size.

7. The method of claim 1 wherein the metadata chunk further comprises information indicating metadata type.

8. The method of claim 1 wherein at least one of the plurality of frames further comprises a format header chunk comprising as a field of the format header chunk a first data element representing a chunk type identifier for the format header chunk and information that indicates stream properties.

9. The method of claim 8 wherein the stream properties comprise codec version information.

10. The method of claim 1 wherein at least one of the plurality of frames further comprises content descriptor metadata.

11. The method of claim 1 wherein the frames are access units for an individual stream within a transport container having a transport format.

12. The method of claim 11 wherein the transport format is a Motion Pictures Experts Group-2 Program Stream format.

13. The method of claim 11 further comprising:

separating an elementary stream from the transport container;

parsing the elementary stream to identify a first occurrence of the synchronization pattern element and the length field;

parsing the elementary stream to identify a second occurrence of the synchronization pattern element at a distance denoted by the length field; and identifying a frame of the elementary stream from a frame arrangement of the transport container based upon the identified occurrences of the synchronization pattern element.

14. The method of claim 1 wherein one or more of the plurality of frames further include a plurality of optional chunks, each optional chunk having as a field of the chunk a first data element representing a chunk type identifier of a type of the respective optional chunk, the synchronization pattern elements and the length fields defining an extent of the respective frame irrespective of the inclusion in or omission from the frame of any particular types of chunks.

15. The method of claim 14, wherein an encoding scheme of the chunk type identifiers includes an escape code for later extensions to an elementary stream definition.

16. The method of claim 1 wherein at least one frame in the plurality of frames includes an end of block chunk to denote an end of the at least one frame.

17. One or more computer-readable memory or storage devices having stored thereon computer-executable instructions operable to cause a computer to perform a method, the method comprising:

receiving audio data encoded in a format for storing audio data on a computer-readable optical storage disk, the obtained audio data arranged in a plurality of frames each having a fixed size, wherein the obtained audio data has been transcoded from a Windows Media Audio (WMA) format, and wherein each of the plurality of frames comprises a plurality of chunks associated with the WMA format, the plurality of chunks comprising:

an audio data chunk comprising a first chunk type field that identifies the audio data chunk;

a metadata chunk comprising a second chunk type field that identifies the metadata chunk; and at least one of: a synchronization chunk comprising a synchronization pattern element, a length field indicating an offset to the beginning of a previous synchronization pattern element, and a third chunk type field that identifies the synchronization chunk; a time stamp chunk comprising time stamp data and a fourth chunk type field that identifies the time stamp chunk; or a cyclic redundancy check chunk comprising cyclic redundancy check data and a fifth chunk type field that identifies the cyclic redundancy check chunk; and decoding the received audio data.

18. The one or more computer-readable memory or storage devices of claim 17, wherein the plurality of chunks comprises the cyclic redundancy check chunk.

19. A decoder device comprising:

a processor; and at least one computer memory storing computer-executable instructions that, when executed by the processor:

receives audio data encoded in a format for storing audio data on a computer-readable optical storage disk, the obtained audio data arranged in a plurality of frames each having a fixed size, wherein the obtained audio data has been transcoded from an intermediate format, and wherein each of the plurality of frames comprises a plurality of chunks associated with the intermediate format, the plurality of chunks comprising:

an audio data chunk comprising a first chunk type field that identifies the audio data chunk;

a metadata chunk comprising a second chunk type field that identifies the metadata chunk; and at least one of: a synchronization chunk comprising a synchronization pattern element, a length field indicating an offset to the beginning of a previous synchronization pattern element, and a third chunk type field that identifies the synchronization chunk; a time stamp chunk comprising time stamp data and a fourth chunk type field that identifies the time stamp chunk; or a cyclic redundancy check chunk comprising cyclic redundancy check data and a fifth chunk type field that identifies the cyclic redundancy check chunk; and decodes the received audio data.

20. The computing device of claim 19, wherein the plurality of chunks comprises the synchronization chunk.

* * * * *